United States Patent
Ong et al.

(10) Patent No.: US 8,489,609 B1
(45) Date of Patent: Jul. 16, 2013

(54) INDEXING MULTIMEDIA WEB CONTENT

(75) Inventors: Edwin Seng Eng Ong, San Francisco, CA (US); Aleksandra Vikati, San Francisco, CA (US)

(73) Assignee: CastTV Inc., San Francisco, CA (US)

( * ) Notice: Subject to any disclaimer, the term of this patent is extended or adjusted under 35 U.S.C. 154(b) by 385 days.

(21) Appl. No.: 11/891,289

(22) Filed: Aug. 8, 2007

Related U.S. Application Data

(60) Provisional application No. 60/821,703, filed on Aug. 8, 2006.

(51) Int. Cl.
*G06F 15/16* (2006.01)
*G06F 17/20* (2006.01)

(52) U.S. Cl.
USPC ............ 707/741; 707/755; 707/913; 707/914

(58) Field of Classification Search
None
See application file for complete search history.

(56) References Cited

U.S. PATENT DOCUMENTS

| | | | |
|---|---|---|---|
| 6,578,050 B1 * | 6/2003 | Daggubati et al. | 707/104.1 |
| 7,162,691 B1 * | 1/2007 | Chatterjee et al. | 715/205 |
| 7,260,564 B1 * | 8/2007 | Lynn et al. | 707/3 |
| 2003/0105681 A1 * | 6/2003 | Oddo | 705/27 |
| 2004/0039757 A1 * | 2/2004 | McClure | 707/201 |
| 2007/0239528 A1 * | 10/2007 | Xie et al. | 705/14 |

* cited by examiner

*Primary Examiner* — Alex Gofman
(74) *Attorney, Agent, or Firm* — Van Pelt, Yi & James LLP

(57) ABSTRACT

A method of indexing multimedia content is disclosed. An element associated with a multimedia content is located in a display page. A potential multimedia content data file is identified through automated processing of data associated with the display page. An index data associated with one or more of the following: the display page, the multimedia content, and the potential multimedia content data file, is generated by processing the potential multimedia content data file.

27 Claims, 7 Drawing Sheets

INDEXING MULTIMEDIA WEB CONTENT

CROSS REFERENCE TO OTHER APPLICATIONS

This application claims priority to U.S. Provisional Patent Application No. 60/821,703 entitled Techniques for Locating, Extracting, and Indexing Multimedia Web Content filed Aug. 8, 2006 which is incorporated herein by reference for all purposes.

BACKGROUND OF THE INVENTION

With the advent of broadband, there is an increasingly large volume of video, audio, and other multimedia content being posted to the Internet and the World Wide Web ("web"). A significant portion of multimedia content is delivered via dynamic formats to web browsers with the appropriate dynamic format modular interface ("plug-in"). Unlike regular web pages, dynamic formats may not be programmed in Hypertext Markup Language ("HTML"). Rather, the code is typically compiled into a different format, which is embedded on a web page and played by a web browser's appropriate plug-in. Certain other multimedia products also follow a similar delivery pattern.

Web crawlers are programs that locate web content. While dynamic formats provide a rich, interactive experience, they present a challenge for web crawlers. Traditional web crawlers are built to parse HTML and other text content by following hypertext links, and automatically submitting forms in order to crawl database-driven information that is not accessible by following links alone. But traditional web crawlers are not able to fully crawl all relevant data upon encountering many web pages in dynamic formats.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Locating, extracting, and indexing multimedia web content is disclosed. In some embodiments, a display page is processed to locate a page element that may be associated with an external multimedia content file, such as an external XML file, which is a data file rather than an actual media file, like a video file itself. The page element is used in some embodiments to determine a locator, such as a URL, associated with an external file. If the external file is determined to contain multimedia content data, e.g., XML data, a data model of the file is built. The data model is used in some embodiments, either directly or indirectly by generating an index entry based thereon, to determine whether the multimedia content with which the external XML file is associated and/or the display page with which it is associated is/are responsive to a query. In some embodiments, data models for content files associated with different websites are normalized to facilitate search for multimedia content across websites.

Figure 1:
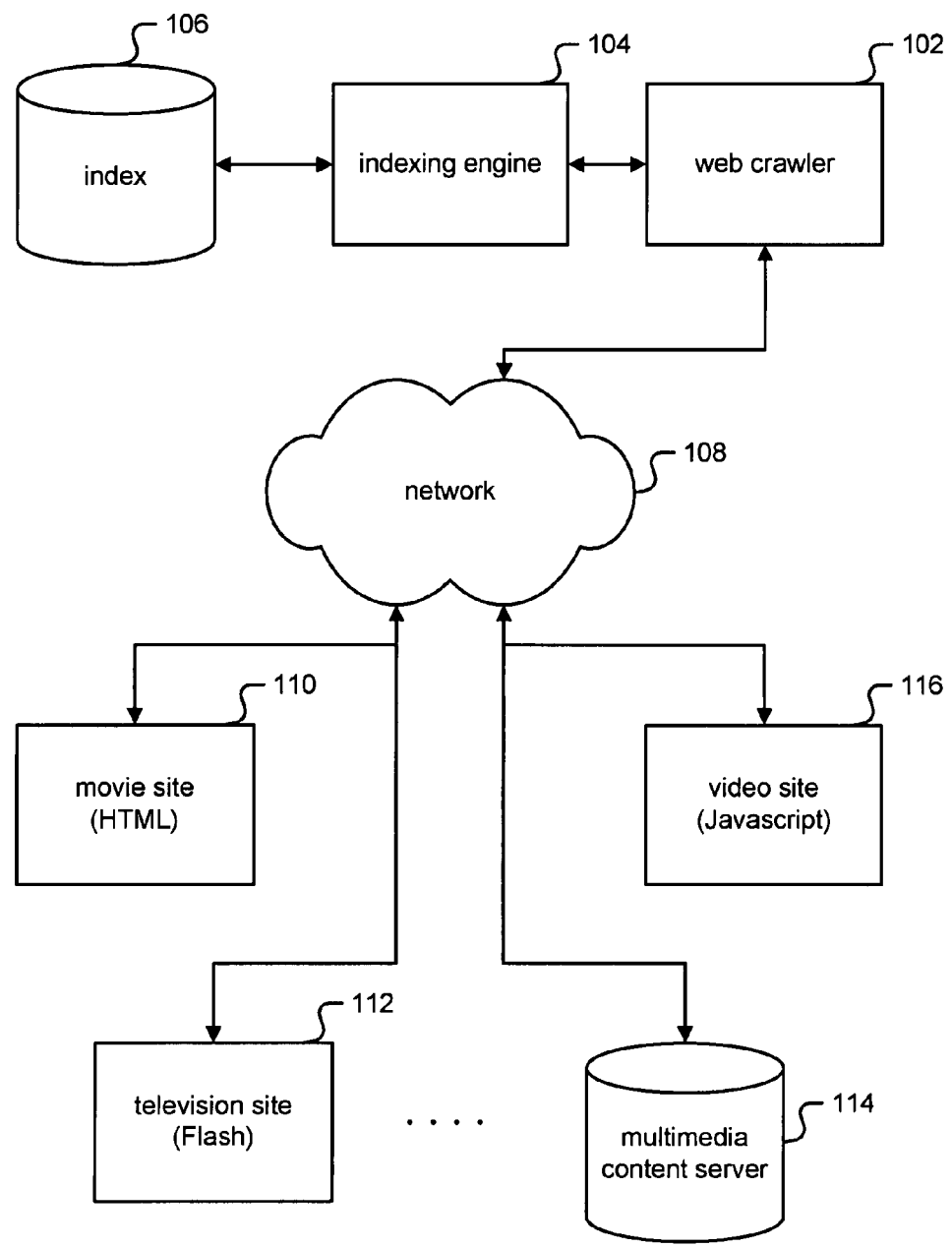
FIG. 1 is a block diagram illustrating an embodiment of a system for indexing actual and/or potential multimedia content data files and/or other rich content.

FIG. 1 is a block diagram illustrating an embodiment of a system for indexing actual and/or potential multimedia content data files and/or other rich content. In the example shown, web crawler 102 locates, extracts and indexes actual and/or potential multimedia content data files. Web crawler 102 is connected to an indexing engine 104 that maintains the index 106 database. Web crawler 102 is also connected to a network 108; a public or private network and/or combination thereof, for example the Internet, an Ethernet, serial/parallel bus, intranet, Local Area Network ("LAN"), Wide Area Network ("WAN"), and other forms of connecting multiple systems and/or groups of systems together.

The network 108 connects web crawler 102 with a variety of different web sites each of which may include or reference multimedia or other rich content. As shown in FIG. 1, examples of web sites that may include or reference multimedia or other rich content include a movie site 110, a television site 112, a multimedia content server 114, and a video site 116. In the example shown in FIG. 1, the movie site 110 comprises one or more display pages written primarily in HTML, the video content of which may be accessible directly to a traditional web crawler/search engine configured to parse HTML. By contrast, in the example shown in FIG. 1 the television site 112 makes video content, e.g., teasers, trailers, and/or entire episodes of shows, as Flash content.

Depending on the implementation, such content may be embedded in a display page in a form that a Flash or other browser plug-in can render, an SWF file for example, or the display page may include a Flash element or component that causes the browser Flash plug-in to retrieve and render an external file, such as an external XML file, that includes the content data. In some embodiments, the multimedia content is actually contained within the JavaScript block in the HTML display page rather than in an external file. In the example shown in FIG. 1, the display pages of video site 116 include or point to JavaScript or other code configured to retrieve and/or to cause a browser or browser plug-in to retrieve video or other content data store in an external XML file. Multimedia content is not always stored within a web site, and in the example shown in FIG. 1, network 108 connects web crawler 102 with at least one multimedia content server 114 that provides multimedia content to a web site like sites 110, 112, and/or 116.

Figure 2:
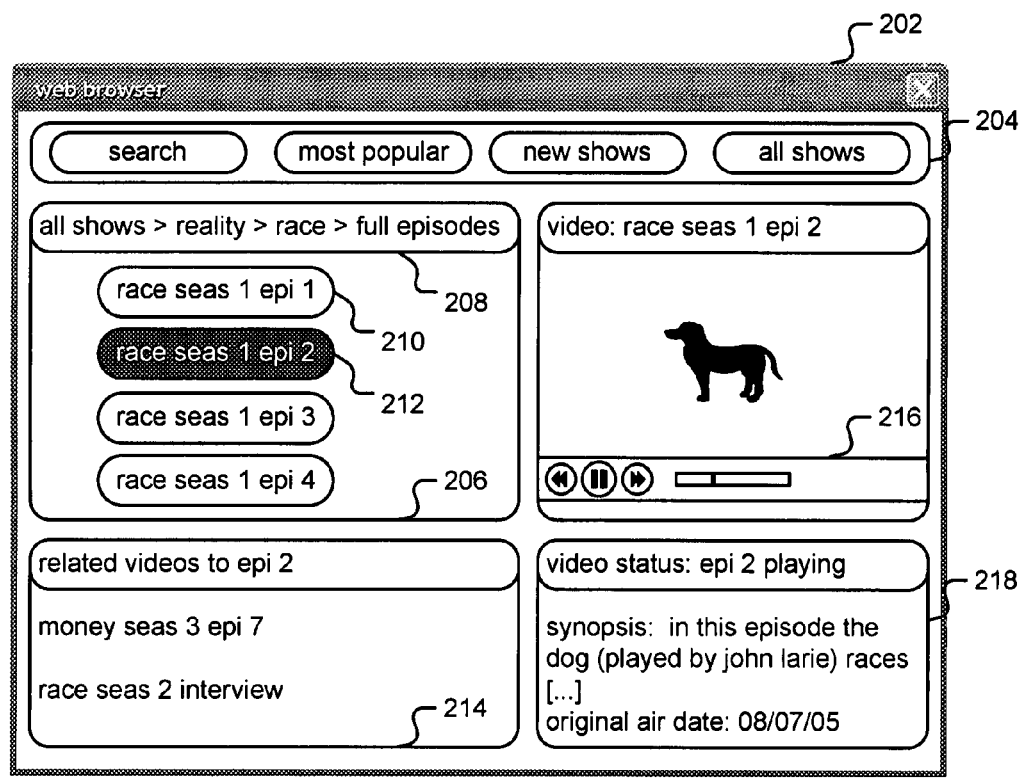
FIG. 2 is a diagram illustrating an embodiment of a display page configured to provide access to multimedia or other rich content.

FIG. 2 is a diagram illustrating an embodiment of a display page configured to provide access to multimedia or other rich content. Examples of a web site that may include a page such as the one shown in FIG. 2 include web sites 110, 112, and 116. Display page 202 shows the layout of the page as rendered by a browser.

Display page 202 includes a quick reference frame 204, which allows the user to search multimedia content data files, see the most popular multimedia content data files, see new multimedia content data files, or browse all multimedia content data files. A browser frame 206 allows the user to browse through a hierarchy of multimedia by genre.

In the example shown in FIG. 2, the browser frame 206 includes a navigation subframe 208, which shows the hierarchy from browsing all shows, to a focus on a "reality show" genre, to a focus on a specific reality show called "race", to a focus on all full episodes available. In some systems the multimedia content data files are interpreted by the web site to output the display in subframe 208. Also within the browser frame 206 in this example are the multimedia content data files available with the given focus in subframe 208. One example would be the first episode from season 1 of race, represented by button 210. In the example shown, the user has selected the second episode from season 1 of race, represented by highlighted button 212.

In the example shown in FIG. 2, the page 202 also includes a related content frame 214 that shows related multimedia content data files to the multimedia content data file highlighted in button 212. In some systems the multimedia content data files are interpreted by the web site to output the display in frame 214. In the example shown in FIG. 2, the display page 202 also includes a frame 216 in which the multimedia content is rendered, including controls for the viewing. In the example shown in FIG. 2, the display page 202 also includes a synopsis frame 218, which may include a title, a description, authors, producers, directors, cast, crew, ratings, run times, and release dates for the multimedia content data being rendered in frame 216.

Many existing web sites use code other than HTML to make multimedia or other rich content available via a display page such as display page 202. In some embodiments, Flash or Javascript or other formats and/or code may be used to make multimedia or other rich content available via a page such as display page 202. In some cases, the actual multimedia content data file may be stored in an eXtensible Markup Language ("XML") or other file stored externally to the display page and/or a server on which the display page resides. For example, such an external XML or other content file may be stored on an external multimedia content server such as server 114. Locating, extracting and indexing such multimedia content data files is disclosed.

Figure 3:
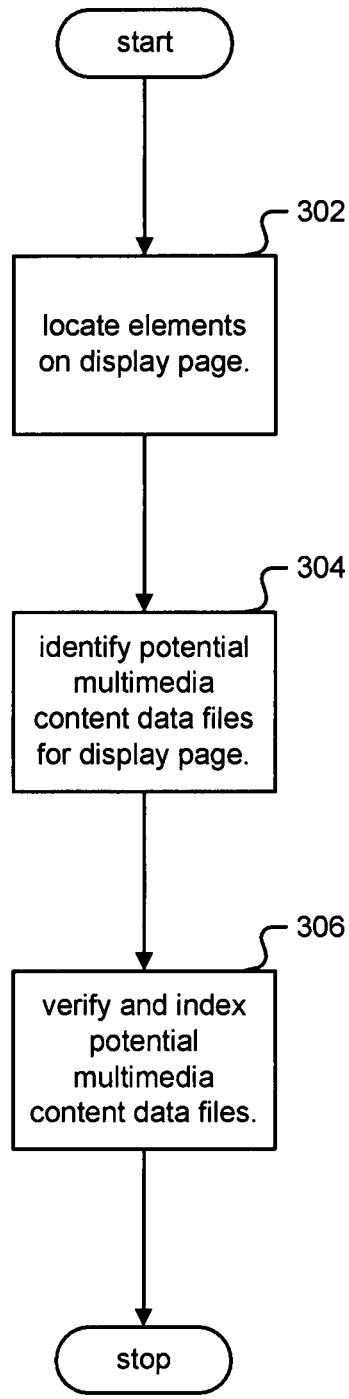
FIG. 3 is a flowchart illustrating an embodiment of a process to locate, extract and index multimedia content data files.

FIG. 3 is a flowchart illustrating an embodiment of a process to locate, extract and index multimedia content data files. The process may be implemented in web crawler 102.

In step 302, the display page 202 is analyzed to locate elements associated with multimedia content. In some embodiments this includes locating elements, such as HTML tags, that indicate multimedia content made available using technologies such as Flash or JavaScript. Examples of page elements associated with multimedia content include OBJECT, EMBED, and similar tags.

In some embodiments, the web crawler 102 finds elements on the HTML in display page 202. In some embodiments, tags are included as elements. The web crawler 102 is configured to locate multimedia made available in formats like Flash or other multimedia web content by first finding the OBJECT, EMBED and other tags in the HTML comprising a display page such as display page 202. Such tags may be used, for example, to embed or point to a multimedia content file, such as a Flash SWF ("SWF") file. In some embodiments, the web crawler 102 finds the tags by regular expressions or Document Object Model ("DOM") traversal.

In step 304, a potential multimedia content data file is identified for display page 202 based on the elements located in step 302. A list of potential multimedia content data files is built.

In step 306, each entry in the list of potential multimedia content data files is loaded to verify whether the potential multimedia content data file contains multimedia content. In some embodiments the actual multimedia content is in XML. Each verified multimedia content data file is indexed, for example by processing one or more XML tags comprising the file to build a data model of the file. In some embodiments, the data model mirrors the model of the XML file. For each tag in the XML, file, a corresponding category is created in the data model. For tags that are sub-tags of other tags, the parent-child relationship is captured in the data model.

Figure 4:
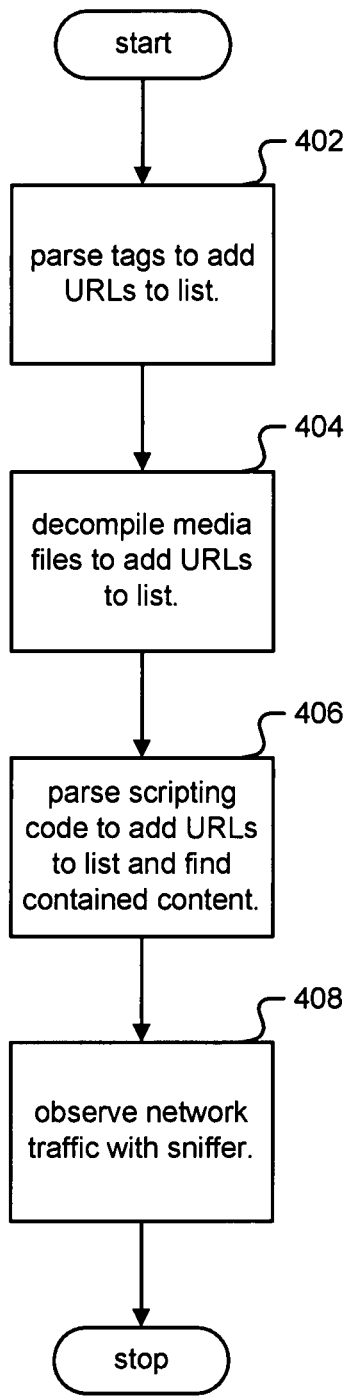
FIG. 4 is a flowchart illustrating an embodiment of a process to identify potential multimedia content data files.

FIG. 4 is a flowchart illustrating an embodiment of a process to identify potential multimedia content data files. In some embodiments, the process of FIG. 4 is included in 304 of FIG. 3. The process may be implemented in web crawler 102.

In step 402, multimedia-related HTML tags included in the display page are parsed to locate any available pointers to potential multimedia content data files. In some embodiments, these pointers are Uniform Resource Locators ("URLs") that point to potential multimedia content data files.

In some embodiments, the web crawler 102 parses the tag by parsing tag attributes, the tag body (which is content enclosed by the open and closed tags), and any URL argument that is part of the attributes or tag body. Upon locating a URL, the URL is added to the XML file list. The web crawler 102 continues this step until all URLs are added to the XML file list.

In step 404, media files, if any, embedded in and/or linked to by the display page, such as a SWF file, are decompiled into source code, which source code is then scanned for any available pointers to potential multimedia content data files. In some embodiments, this includes scanning the binary source code for plain text URLs. Upon encountering a URL, the URL is added to the XML file list. The web crawler 102 continues this step until all URLs are added to the XML file list.

In step 406, the web crawler 102 locates scripting code on the display page 202. In some embodiments, the scripting code includes JavaScript. The code may be inline or located in a referenced external script file. In some embodiments, JavaScript external scripts may be referenced using the SCRIPT tag technique, for example using <SCRIPT SRC="external_file.js></SCRIPT> to refer to a script file named external_file.js. The web crawler 102 does the same with the frame parent or pop-up parent of display page 202, if any exist. The web crawler 102 scans the scripting code to find any available pointers to potential multimedia content data files, or potential multimedia content data files actually contained within the scripting code.

In some embodiments, the web crawler 102 executes the scripting code via a code interpreter to locate additional pointers to potential multimedia content data files that are not evident by scanning un-interpreted script code alone. Upon encountering a URL, the URL is added to the XML file list. The web crawler 102 continues this step until all URLs are added to the XML file list.

In step 408, a sniffer may be used to observe network traffic between a data source and the web crawler 102. An analysis of the observed network traffic may infer additional pointers to potential multimedia content data files by parsing the sniffer output to identify potential multimedia content data files by locating tags and formats, or reconstruct obfuscated data.

In some embodiments, the process of FIG. 4 includes and/or is controlled at least in part by logic that omits one or more of steps 402, 404, 406, and 408 depending on whether any URL's and/or potential multimedia content files have been located. For example, in some embodiments step 408 is performed only if no potential multimedia content files have been located after completing steps 402, 404, and 406.

Figure 5:
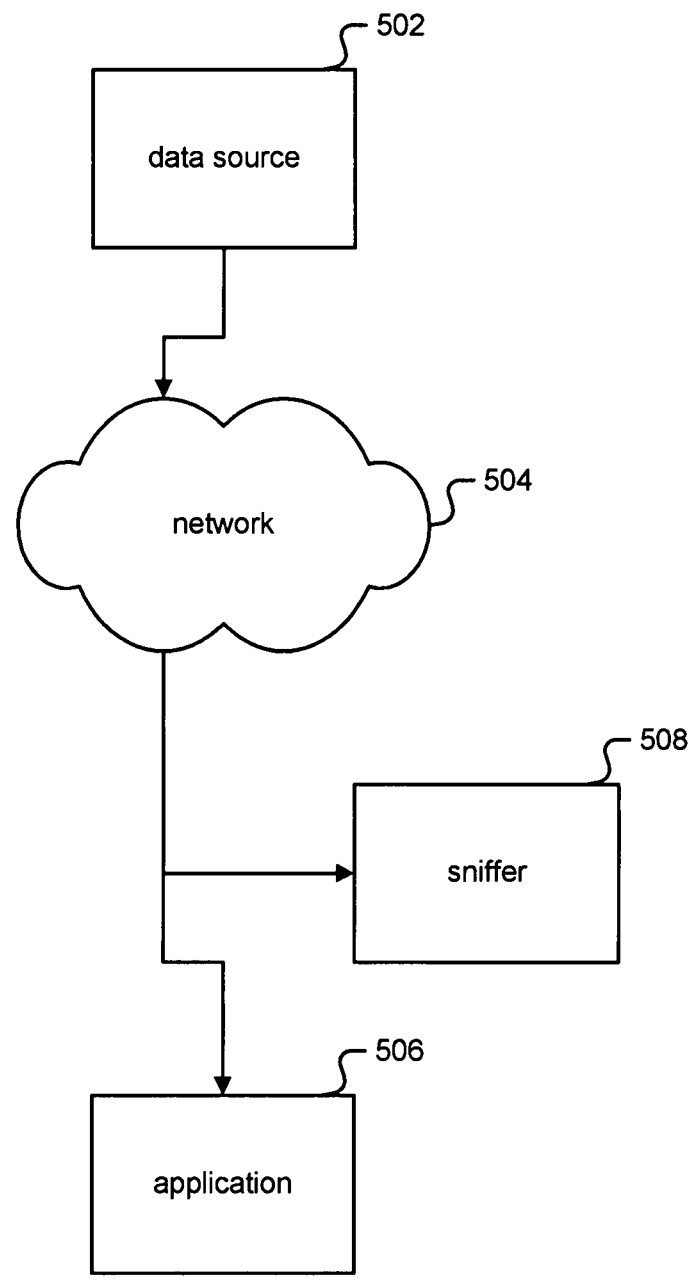
FIG. 5 is a block diagram illustrating an embodiment of a system configured to use a sniffer to observe network traffic between a data source and an application.

FIG. 5 is a block diagram illustrating an embodiment of a system configured to use a sniffer to observe network traffic between a data source and an application. This system may be implemented to process step 408.

Data source 502 represents a source for the data in display page 202 with data coming either from a web site like television site 112, or multimedia content server 114. Data source 502 is connected to a network 504; a public or private network and/or combination thereof, for example the Internet, an Ethernet, serial/parallel bus, intranet, Local Area Network ("LAN"), Wide Area Network ("WAN"), and other forms of connecting multiple systems and/or groups of systems together. The application 506 is also connected to network 504 to data source 502, and an example of application 506 is web crawler 102.

Sniffer 508 is set up to observe web traffic between data source 502 and application 506. In some embodiments, the sniffer is optimized to analyze HyperText Transfer Protocol ("HTTP") traffic, and parses the HTTP traffic to recognize XML data as comprising or being associated with a potential multimedia content data file. In some embodiments, the sniffer identifies an XML file by parsing and identifying XML tags using regular expressions or DOM traversal. The sniffer 508 is useful in instances where either the pointer to multimedia content data files or multimedia content data files themselves are intentionally or unintentionally obfuscated within display page 202.

Figure 6:
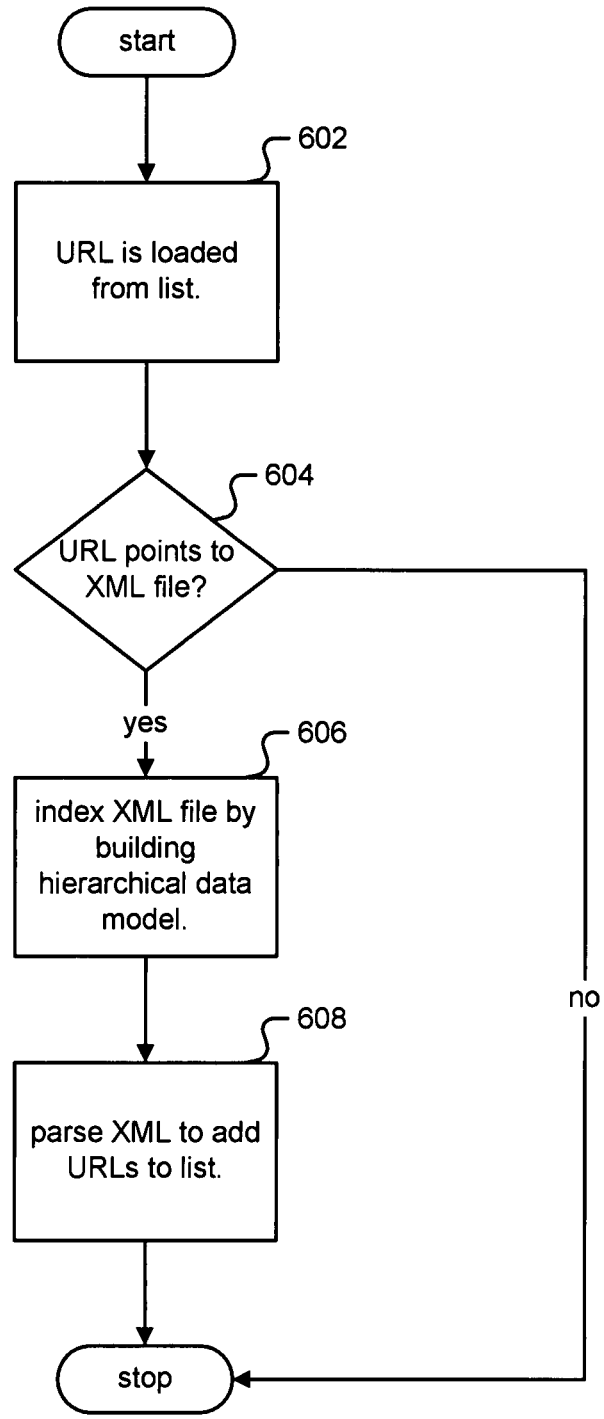
FIG. 6 is a flowchart illustrating an embodiment of a process to verify and index potential multimedia content data files.

FIG. 6 is a flowchart illustrating an embodiment of a process to verify and index potential multimedia content data files. In some embodiments, the process of FIG. 6 is included in 306 of FIG. 3. The process may be implemented in web crawler 102.

In step 602, a pointer to a potential multimedia content data file is loaded from the list of pointers. In some embodiments, a URL is loaded from an XML file list. If it is determined in step 604 that the pointer points to a multimedia content data file, then control is transferred to step 606. In some embodiments this can be determined by examining the loaded page for XML tags.

In step 606, the web crawler 102 proceeds to index the multimedia content data file. In some embodiments, for each XML file, a data model is built. The data model "mirrors" the model of the XML file. For each tag in the XML file, a corresponding category is created in the data model. For tags that are sub-tags of other tags, the parent-child relationship is captured in the data model.

In some embodiments, a data model is a relational database. A table is created for each type of tag encountered. For example, if the XML file contains the tag <category>, a table is created for the <category> tag. Multiple occurrences of the same tag are entered as rows. For example, if both <category>Movie</category> and <category>TV</category> occur in the same file, two rows, one with value "Movie" and one with value "TV" are entered in the category table. To express parent-child relationship, an additional table or column can be created to express such a relationship. For example, if <subcategory>Drama</subcategory> is a sub-tag of <category>TV</category>, then the row which contains "Drama" in the subcategory table may have an additional column with the value being the ID of the row that contains "TV" in the category table.

By standardizing categories, a normalized index database 106 can be searched with the same search terms for different web sites 110, 112, and 114. For example, by searching for a date, a search engine utilizing the index database 106 can find television air dates, movie release dates and video production dates that all match the searched dates.

In step 608, for tag values or attributes that are pointers to potential multimedia content data files or URLs, the pointers or URLs are added to the XML file list for indexing.

Figure 7:
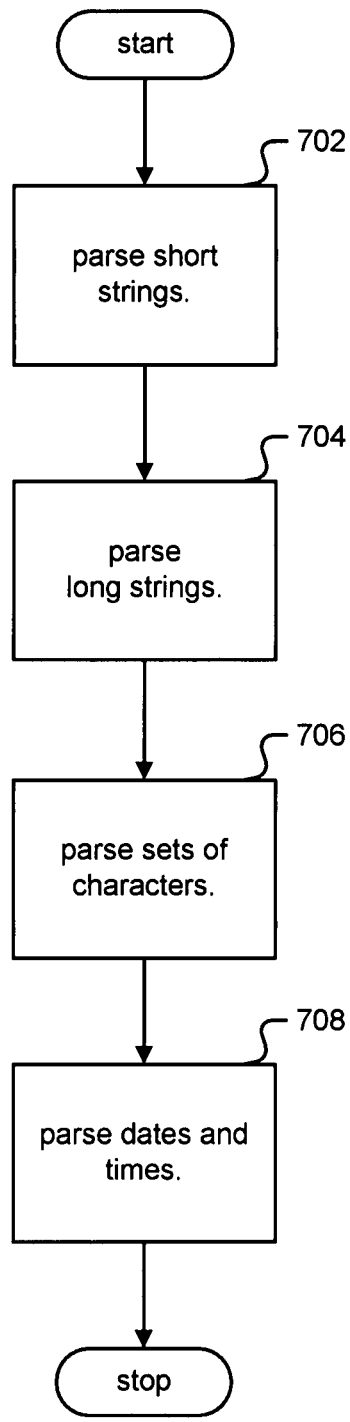
FIG. 7 is a flowchart illustrating an embodiment of a heuristic to build a standard data model.

FIG. 7 is a flowchart illustrating an embodiment of a heuristic to build a standard data model. In some embodiments, the process of FIG. 7 is included in 606 of FIG. 6. The process may be implemented in web crawler 102.

In step 702, if the data type of a table is a short string, then a potential mapping to test includes using the values as titles of the multimedia content, or genres of the multimedia content. For example, a title may refer to the title of a television series or the title of a movie. In some embodiments, the mapping is tested by matching known values. In some embodiments, if a short string cannot be mapped and the heuristic fails, an exception is generated for human interaction and mapping. In some embodiments, a mapping received via user input, e.g., via a user interface, is learned in the sense that the association between a particular element of the data model and an information type to which it maps, e.g., title, is stored and used to generate the appropriate mapping without further human interaction when building subsequently a data model of a subsequently processed multimedia content file from the same source.

In step 704, if the data type of a table is a long string or paragraph, then a potential mapping to test includes using the values as a description of the multimedia content. For example, a description may include a synopsis of a television episode or description of a movie. Within the description, proper names may be identified as authors, producers, directors, cast, or crew. In some embodiments, the mapping is tested by matching known values. In some embodiments, if a long string cannot be mapped and the heuristic fails, an exception is generated for human interaction and mapping.

In step 706, if the data type of a table is a string of one or more characters included in a set of strings associated with a content rating, then a potential mapping to test includes using the values as a rating of the multimedia content. For example, a rating may include a Motion Pictures Association of America ("MPAA") rating. In some embodiments, the mapping is tested by matching known values such as "G", "PG", "PG-13", "R", and "NC-17." In some embodiments, if a string cannot be mapped and the heuristic fails, an exception is generated for human interaction and mapping.

In step 708, if the data type of a table is a date or time, then a potential mapping to test includes using the values as a release date or runtime of the multimedia content. Throughout this specification a "release date" refers to any date related to the multimedia content, for example an airdate for a television show, a release date for a movie, or a production date for a video. A runtime refers to the play length of the multimedia content. In some embodiments, the mapping is tested by matching known values. In some embodiments, if a date or time cannot be mapped and the heuristic fails, an exception is generated for human interaction and mapping.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of indexing multimedia content comprising:
   locating in a display page an element by using regular expressions or Document Object Model (DOM) traversal, wherein the element is a tag associated with a multimedia content;
   identifying a binary multimedia application code, wherein the binary multimedia application code is embedded in or linked to the display page via the element;
   using a processor to automatically scan the binary multimedia application code for a plain text pointer to a potential multimedia content data file;
   decompiling the binary multimedia application code;
   using a sniffer to parse network traffic to identify an obfuscated potential multimedia content data file by parsing HTTP traffic to recognize XML files by identifying XML tags using regular expressions or DOM traversal;
   testing a potential association of the heuristic by matching known values;
   in the event the heuristic fails, generating an exception for human interaction and mapping; and
   processing the potential multimedia content data file to generate an index data for the multimedia content, wherein:
   1) processing the potential multimedia content data file includes building a data model of the potential multimedia content data file; and
   2) wherein to build the data model comprises applying a heuristic that associates a short string as a title; a long string as a description; a string included in a set of rating strings as a rating; and a date as a release date.

2. A method as recited in claim 1, wherein the automated processing comprises monitoring a network communication associated with the display page.

3. A method as recited in claim 1, wherein the potential multimedia content data file comprises XML.

4. A method as recited in claim 1, wherein the potential multimedia content data file is contained within a script.

5. A method as recited in claim 1, wherein the potential multimedia content data file is external to the display page.

6. A method as recited in claim 1, wherein the potential multimedia content data file is stored externally to a system on which the display page resides.

7. A method as recited in claim 1, wherein the display page comprises HTML.

8. A method as recited in claim 1, wherein processing the potential multimedia content data file includes identifying through automated processing of data associated with the potential multimedia content data file a nested potential multimedia content data file.

9. A method as recited in claim 1, further comprising using the data model to determine that the multimedia content is responsive to a query.

10. A method as recited in claim 1, wherein to build the data model comprises applying a heuristic.

11. A method as recited in claim 1, wherein to build the data model comprises applying a heuristic; testing a potential association of the heuristic by matching known values; and generating an exception for human interaction if the heuristic fails.

12. A method as recited in claim 1, wherein the data model is implemented using a relational database.

13. A method as recited in claim 1, wherein the data model is implemented using a relational database such that each element type represents a table.

14. A method as recited in claim 1, wherein the data model is normalized when compared with a second data model associated with a second display page.

15. A method as recited in claim 14, wherein normalizing the data model comprises standardizing a category of the data model, wherein the category corresponds to a multimedia content data file tag.

16. A method as recited in claim 1, further comprising using the data model to determine that the multimedia content data file is responsive to a query, and if it responsive to the query, returning data identifying the display page.

17. A method as recited in claim 1, further comprising decompiling the binary multimedia application code, wherein the binary multimedia application code is a Flash SWF file.

18. A method as recited in claim 17, further comprising using a sniffer to parse network traffic to identify a second potential multimedia content data file to generate a second index data.

19. A method as recited in claim 18, wherein parsing network traffic includes parsing HTTP traffic to recognize XML data.

20. A method as recite in claim 1, wherein multiple occurrences of a same multimedia content data file tag are entered as rows in the table.

21. A method as recite in claim 1, wherein multimedia content data file tags that are sub-tags of other tags are captured in the data model as a parent-child relationship.

22. A system of indexing a potential multimedia content data file, comprising
   a processor;
   a sniffer configured to parse network traffic and coupled with the processor; and
   a memory coupled with the processor, wherein the memory is configured to provide the processor with instructions which when executed cause the processor to:
   locate in a display page an element, by using regular expressions or Document Object Model (DOM) traversal, wherein the element is a tag associated with a multimedia content;
   identify a binary multimedia application code, wherein the binary multimedia application code is embedded in or linked to the display page via the element;

automatically scan the binary multimedia application code for a plain text pointer to a potential multimedia content data file;

decompile the binary multimedia application code;

use the sniffer to parse network traffic to identify an obfuscated potential multimedia content data file by parsing HTTP traffic to recognize XML files by identifying XML tags using regular expressions or DOM traversal;

test a potential association of the heuristic by matching known values;

in the event the heuristic fails, generating an exception for human interaction and mapping; and process the potential multimedia content data file to generate an index data for the multimedia content, wherein:
1) to process the potential multimedia content data file includes building a data model of the potential multimedia content data file; and
2) wherein to build the data model comprises applying a heuristic that associates a short string as a title; a long string as a description; a string included in a set of rating strings as a rating; and a date as a release date.

23. A system as recited in claim 22, wherein the processor is further configured to decompile the binary multimedia application code, wherein the binary multimedia application code is a Flash SWF file.

24. A system as recited in claim 22, wherein processing the potential multimedia content data file includes building a data model of the potential multimedia content data file.

25. A computer program product for indexing a potential multimedia content data file, the computer program product being embodied in a non-transitory computer readable medium and comprising computer instructions for:

locating in a display page an element by using regular expressions or Document Object Model (DOM) traversal, wherein the element is a tag associated with a multimedia content;

identifying a binary multimedia application code, wherein the binary multimedia application code is embedded in or linked to the display page via the element;

automatically scanning the binary multimedia application code for a plain text pointer to a potential multimedia content data file;

decompiling the binary multimedia application code;

using a sniffer to parse network traffic to identify an obfuscated potential multimedia content data file by parsing HTTP traffic to recognize XML files by identifying XML tags using regular expressions or DOM traversal;

testing a potential association of the heuristic by matching known values;

in the event the heuristic fails, generating an exception for human interaction and mapping; and processing the potential multimedia content data file to generate an index data for the multimedia content, wherein:
1) processing the potential multimedia content data file includes building a data model of the potential multimedia content data file; and
2) wherein to build the data model comprises applying a heuristic that associates a short string as a title; a long string as a description; a string included in a set of rating strings as a rating; and a date as a release date.

26. A computer program product as recited in claim 25, further comprising computer instructions for decompiling the binary multimedia application code, wherein the binary multimedia application code is a Flash SWF file.

27. A computer program product as recited in claim 25, wherein processing the potential multimedia content data file includes building a data model of the potential multimedia content data file.

* * * * *